Sept. 13, 1932.  E. G. WATROUS  1,876,810
FAUCET
Filed June 15, 1931   2 Sheets-Sheet 1
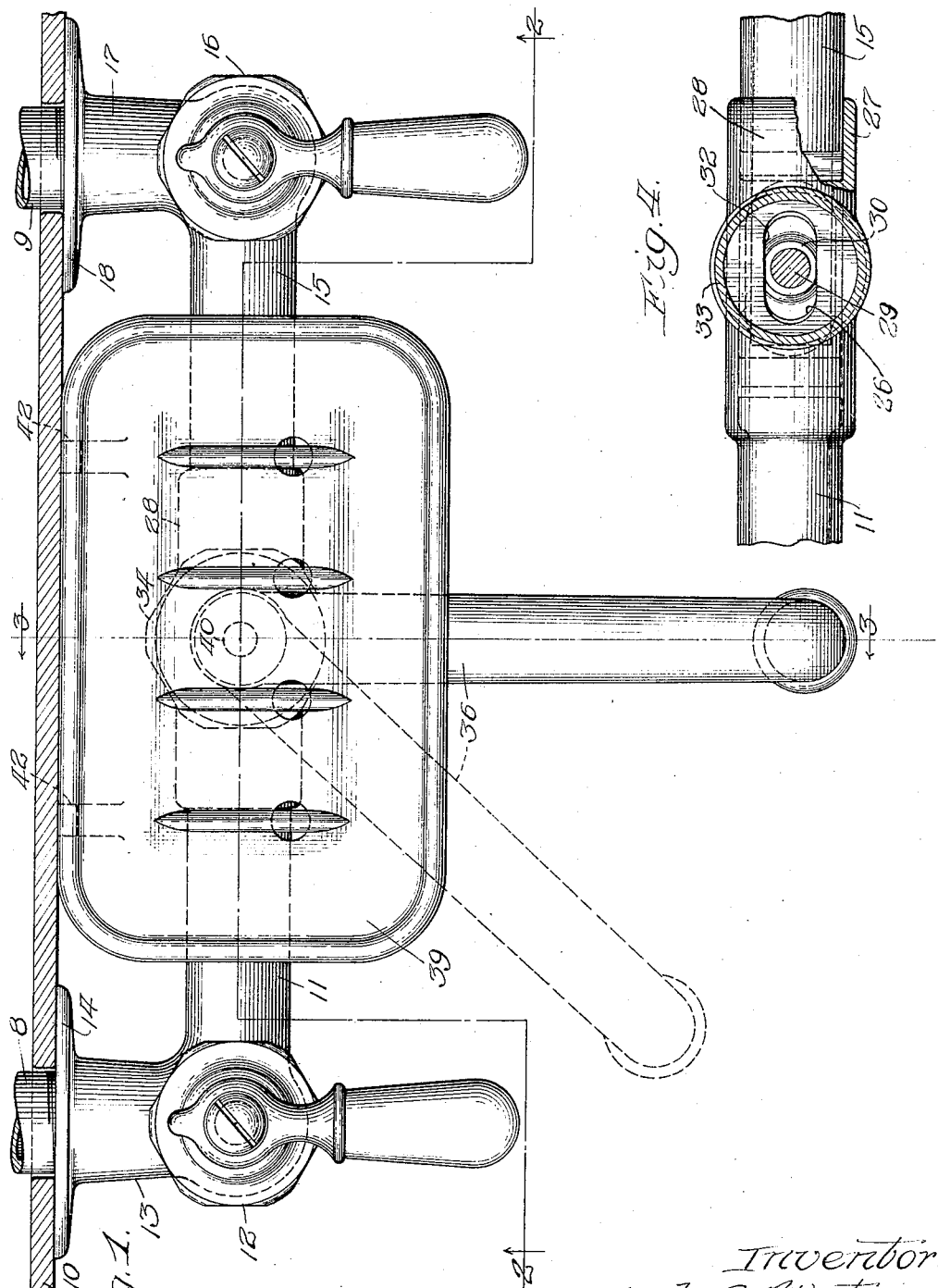

Sept. 13, 1932.  E. G. WATROUS  1,876,810
FAUCET
Filed June 15, 1931   2 Sheets-Sheet 2
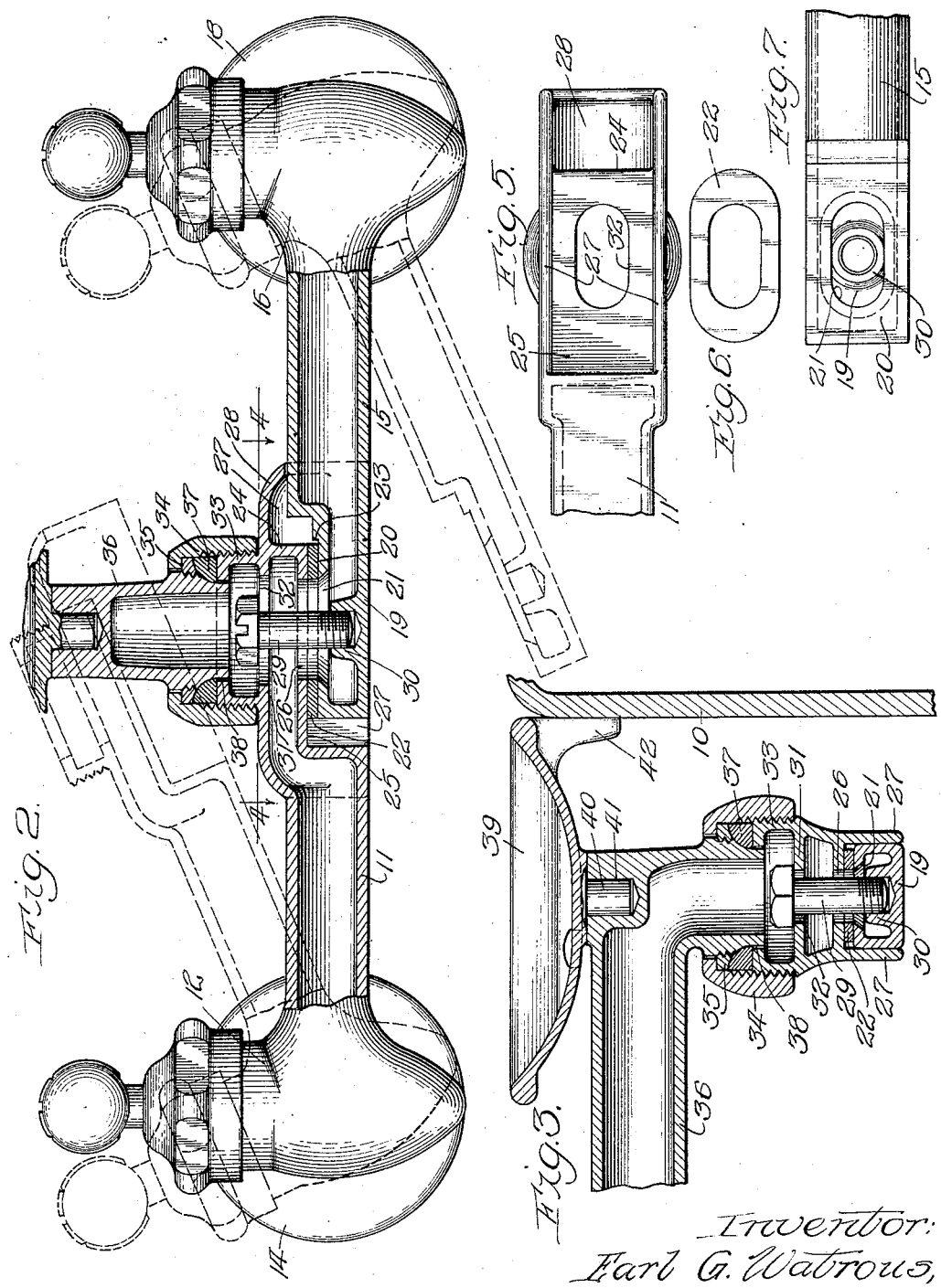
Inventor:
Earl G. Watrous,
By Glenn S. Noble
Atty.

Patented Sept. 13, 1932

1,876,810

UNITED STATES PATENT OFFICE

EARL G. WATROUS, OF CHICAGO, ILLINOIS

FAUCET

Application filed June 15, 1931. Serial No. 544,560.

This invention relates to faucets of the kind in which water from two sources of supply, as for instance hot and cold water, is discharged through a common spout, such faucets frequently used for kitchens. When the buildings are made the supply pipes are installed in approximately the proper position for connecting the faucet. However, these supply pipes are usually at different distances apart so that faucets have heretofore been supplied with eccentric connections whereby such differences in spacing may be compensated for. These connections not only require considerable work in order to make proper joints but also require considerable room so that the body of the faucet stands out at a considerable distance from the back of the sink to which it is applied. In accordance with the present invention, I provide a faucet having means for longitudinal adjustment so that it may be applied to supply pipes at various distances apart.

Other objects of this invention are to provide an improved faucet which will be of comparatively simple construction and which may be easily installed; to provide a faucet having simple means for longitudinal adjustment; to provide a faucet in combination with a soap dish of novel construction; and to provide such other structural features and advantages as will appear from the following description.

In the accompanying drawings illustrating this invention;

Figure 1 is a plan view;

Figure 2 is a sectional view taken on the line 2—2 of Figure 1;

Figure 3 is a sectional view taken on the line 3—3 of Figure 1;

Figure 4 is a sectional view taken on the line 4—4 of Figure 2; and

Figures 5, 6 and 7 are details of the valve body connecting means or joint.

The pipes 8 and 9 represent the usual supply pipes, as for instance, for hot and cold water respectively, these pipes extending through the back 10 of a sink or through any other similar wall or support. The faucet comprises two sections, one section 11 being provided with a valve 12 with a rearwardly extending connection 13 which is threaded to engage with the pipe 8. This portion is also provided with a flange 14 adapted to fit against the face of the plate or panel 10 and to cover the pipe hole therethrough. The other section 15 of the faucet has a valve 16 as for the cold water, and has a rearwardly extending connecting portion 17 which is threaded for engagement with the pipe 9. This portion is also provided with a flange 18 similar to the flange 14.

One of the particularly novel features of the invention consists in the provision of means for adjustably connecting the sections 11 and 15 and connecting the same with the discharge spout. The section 15 is closed at its free end and is made somewhat thinner than the main portion for a short distance to provide a coupling or joint section 19 which has a flat top 20 with an elongated hole 21 therethrough. A washer or gasket 22 engages with the face 20 and may be held against movement by a shoulder 23.

The faucet section 11 is also provided with a joint or connecting portion 24, as shown, having a flat seat or engaging surface 25 which fits against the washer 22. This lower engaging wall also has an elongated hole 26 which is adapted to register with the hole through the washer. The connecting portion 24 has side walls 27 which fit over the sides of the joint or connecting portion 19 of the section 15. The joint section 24 also has a curved top wall 28 which projects outwardly over the main portion of the section 15 so that when the parts are united the joint will have a neat and finished appearance. The overlapping and telescoping ends of the right and left hand body sections are held together by means of a bolt or screw 29 which engages with a threaded boss or lug 30 in the bottom of the section 19 and with the top wall 31 of the connecting portion 24. This wall has an elongated hole or slot 32 through which the bolt projects and which provides an outlet for the joined body sections.

The end or section 24 has an upwardly extending hollow projection or coupling member 33 which is threaded to receive a spout sleeve nut 34 which engages with a flange or abutment 35 on the spout 36 for fastening the spout in position. A gasket or washer 37 is interposed between the spout and the adjacent parts to make a tight joint. The inner end of the spout engages in a hole 38 in the connecting member 33 thereby making a substantial fastening for holding the spout securely in position while permitting the swinging of the same in a horizontal plane.

The soap dish 39 is mounted on the spout 36, being provided with a pivot or trunnion 40 which fits in a socket 41 in the spout and is in axial alignment with the joint or pivot on which the spout swings. This dish is also provided with fingers or projections 42 which are adapted to bear against the wall or plate 10 and serve to prevent the rotation of the soap dish when the spout is being swung.

When my improved faucet is to be installed, one valve body section, as for instance, the left hand section, is screwed onto the supply pipe 8 until it reaches approximately its tight position but is stopped out of the way so that the other valve body section may be screwed onto its supply pipe until it is approximately tight and the two sections then are brought to approach each other as indicated by the dotted lines in Figure 2. When these sections are brought together the bolt 29 is inserted and the joint made tight. On account of the elongated outlet holes and the clearance or telescoping permitted between the two joint sections, it is not necessary to have the openings in exact alignment and considerable variation in the spacing of the supply pipes 8 and 9 may be compensated for by this telescoping connection between the two sections. In other words, the connection 24 may assume any position longitudinally of the other section so long as the hole 26 does not extend over the packing or washer 22 but the parts are preferably so constructed that there will be proper registration of these joint members if the bolt 29 can be inserted in fastening position. The spout and soap dish may then be assembled and the device is in condition for operation.

While I have shown a preferred construction it will be evident that the faucet may be changed in design or in details in order to adapt it for different installations and therefore I do not wish to be limited to the exact construction herein shown and described except as specified in the following claims, in which I claim.

1. A faucet of the character described, having two coacting valve body sections with a common outlet and means for adjustably connecting the ends of the sections.

2. A faucet for two supply pipes, having two valve body sections with their ends adjustably connected and a common outlet spout leading from the connected ends.

3. A faucet comprising a valve body adapted to be secured directly to a supply pipe and having an outlet extension, a second valve body also adapted to be secured directly to a supply pipe and having an outlet extension, an adjustable joint between the ends of said extensions and an outlet spout connected with said joint.

4. A device as per claim 3, in which the ends of the extensions are made in telescoping form with elongated openings between the ends, and a screw for holding the ends together.

5. In a faucet, the combination of a valve body adapted to be secured to a supply pipe and having an outlet projection with a flat upper face at the end thereof having a hole therethrough, a second valve body adapted to be secured to a supply pipe and having an outlet projection adapted to fit over the end of the first named projection and having a flat face with a hole therethrough, a washer arranged between said faces, a bolt for holding the two engaging sections together, and a spout swingingly connected with the last named section and providing a common outlet for the two valve bodies.

6. A faucet of the character set forth, having two valve body sections, an adjustable joint between said sections to permit longitudinal adjustment of the sections with respect to each other, and a swinging spout connected with one section and furnishing a common outlet.

7. In a device of the character set forth, the combination of a faucet having two valve body sections adjustably connected together, an outlet spout pivotally connected with one of said sections, a soap dish pivotally mounted on the outlet spout, and means for preventing rotation of the soap dish when the spout is swung.

8. A device as per claim 7, in which the soap dish is provided with projections for engagement with an adjacent wall to prevent rotation of the same.

9. The combination with a swinging faucet spout, of a soap dish having a pivot engaging with the spout and in axial alignment with the spout pivot, said dish being adapted to engage with an adjacent wall to prevent rotation of the same.

10. The combination of two water supply pipes, valve bodies engaging with said supply pipes and having outlet extensions with their ends adjustably connected to form a joint therebetween, a threaded coupling member on one of said ends, a spout engaging with the coupling member, and a sleeve nut for holding the spout in rotatable engagement with said member, said spout providing a common outlet for the two valve bodies.

EARL G. WATROUS.